(12) United States Patent
Kaye et al.

(10) Patent No.: US 6,343,639 B1
(45) Date of Patent: Feb. 5, 2002

(54) MACHINE FOR LAYING UP FABRIC TO PRODUCE A LAMINATE

(75) Inventors: Allan Kaye, Bristol; Ian Marlowe, Peterborough; Andrew Mills; Robert Backhouse, both of Cranfield, all of (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/448,897

(22) Filed: Nov. 29, 1999

(30) Foreign Application Priority Data

Nov. 28, 1998 (GB) .............................................. 9825999

(51) Int. Cl.[7] .............................................. B32B 31/00
(52) U.S. Cl. ........................ 156/539; 156/538; 156/574
(58) Field of Search ................................ 156/230, 267, 156/285, 510, 538, 539, 556, 574

(56) References Cited

U.S. PATENT DOCUMENTS

| | | | | |
|---|---|---|---|---|
| 4,541,886 A | * | 9/1985 | Marlow et al. | 156/230 |
| 4,591,402 A | * | 5/1986 | Evans et al. | 156/350 |
| 4,696,707 A | * | 9/1987 | Lewis et al. | 156/64 |
| 5,074,948 A | * | 12/1991 | Greffioz et al. | 156/361 |
| 5,141,572 A | * | 8/1992 | Gerber | 156/64 |

* cited by examiner

Primary Examiner—James Sells
(74) Attorney, Agent, or Firm—Nixon & Vanderhye P.C.

(57) ABSTRACT

The machine comprises a forming station 18 for receiving a piece of fabric 28 which is shaped at the forming station by a cutter 26. A plurality of lay up stations 40, 42 is provided and a roller 48 is used to carry the shaped fabric 28a from the forming station 18 to one or other of the lay-up stations 40,42. The roller 48 lays the shaped fabric in position at the lay-up station to form part of a laminate at that station. The process is repeated to produce a laminate at the remaining lay-up station. A pick-up device 34 is provided for picking up scrap material left as a peripheral band 36 around the shaped fabric 28a.

39 Claims, 4 Drawing Sheets

MACHINE FOR LAYING UP FABRIC TO PRODUCE A LAMINATE

The invention relates to a machine for laying up fabric to produce a laminate and is primarily concerned with the laying up of fabric to produce skins for aerofoils such as top and bottom skins for aircraft wings.

Fibre reinforced plastics materials, for example glass or carbon fibre composite materials, can be laid one upon the other in an uncured form to produce a laminate which is then cured to form the final article. Such a material can be produced by laying up tapes side by side as described in UK No 0 118 266 on a single tool and it will be appreciated that manufacture of large wing skins by such a method is a lengthy process.

The present invention is concerned with the production of laminates from pieces of fabric which will enable the laminates to be produced more quickly than hitherto.

According to the invention there is provided a machine for laying up fabric to produce laminates, comprising a forming station for receiving a piece of fabric, profiling means at the forming station for shaping the fabric, a plurality of lay-up stations and carrier means for carrying the shaped fabric from the forming station to one or other of the lay-up stations and laying it in position at the selected lay-up station to form part of a laminate at that station, the process being repeated to produce a laminate at one or more of the remaining lay-up stations.

Such a machine enables several laminates such as top and bottom wing skins to be produced on a single machine and is of considerable advantage in that respect.

Means may be provided for positioning the piece of fabric, which may be in the form of a sheet, at the forming station. The forming station may comprise a table on which the piece of fabric is placed and the table may include retention means and/or release means for the fabric. Conveniently, retention means may include the provision for applying vacuum to the surface of the fabric lying on the table to suck the fabric into firm contact with the table. To release the fabric, the vacuum may be released and a positive pressure applied to the said surface of the fabric. Where the fabric is an uncured fibre reinforced plastics, it may have a sticky surface which will tend to adhere to the table and the application of positive air pressure is useful in ensuring that it will be fully released when required.

The profiling means may comprise a beam of laser light or other suitable cutter which preferably cuts the fabric so as to leave a peripheral length of waste. A single length of waste may be formed such as a ring of waste material around a predetermined cut shape. A suitable removal means may be provided for removing the waste and may take the form of a rotary member such as a wheel or roll. Conveniently, vacuum may be applied to retain the cut piece of fabric in place while the scrap is being removed. The aforesaid removal means may serve a dual purpose. In that respect, it may be used to draw the piece of fabric on to the forming station as well as being used to remove the scrap after the fabric has been cut.

The aforesaid carrier means may comprise an elongate roller. The shaped formed fabric may also be elongate and may be picked up by the roller so as to lie around the periphery of the roller and extend longitudinally thereof. The roller can then take the elongate section of fabric from the forming station and deposit the fabric at the selected lay-up station. The roller then returns to the forming station to pick up the next piece of formed fabric for delivery to the previous or a further lay-up station. The roller may be divided into axial segments which can be subjected to air pressure, e.g. vacuum. The roller can be applied to the cut fabric at the forming station and vacuum applied to the roller thereby causing the cut fabric to adhere to the surface of the roller. Once the roller has taken the fabric to a lay-up station, positive pressure can then be applied in order to ensure that the fabric detaches from the surface of the roller for placement at the lay-up station.

The roller may also be divided circumferentially into a plurality of sectors and the sectors may house a foam or foam like material which provides a flexible periphery for the roller. Peripheral surfaces of the foam may be protected by a layer of film which may be perforated.

The roller may be mounted on adjustable mountings which will permit the outer tube of the roller to be varied. e.g. for pitch, yaw and for axial movement.

In order to ensure that the fabric is laid up accurately, position sensing means may be provided for the carrier means so that the position of the carrier means relative to a set datum can be determined. In that way, the position of the formed fabric oil the carrier means can be determined relative to the datum and, in that way, accurate placement of the fabric at the selected lay-up station can be ensured. The or a further position sensing means may be provided for sensing the position of the profiling means relative to the same or another datum.

Four lay-up stations may be provided which are adapted to receive shaped fabrics for laying up the respective upper and lower skins for port and starboard aerofoils such as the wings of an aircraft. The profiling means may be programmed to cut left and right hand shapes for the various wing skins.

The skins may be formed by laying a plurality of elongate skin sections edge-to-edge to form a further layer and by laying additional elongate skin sections edge-to-edge to form one or more further layers upon the first layer. In such a case, the edges of the skin sections of one layer are preferably staggered in relation to the edges of the skin sections of an adjacent layer of the laminate.

A machine in accordance with the invention will now be described by way of example with reference to the accompanying drawings in which.

Figure 4:
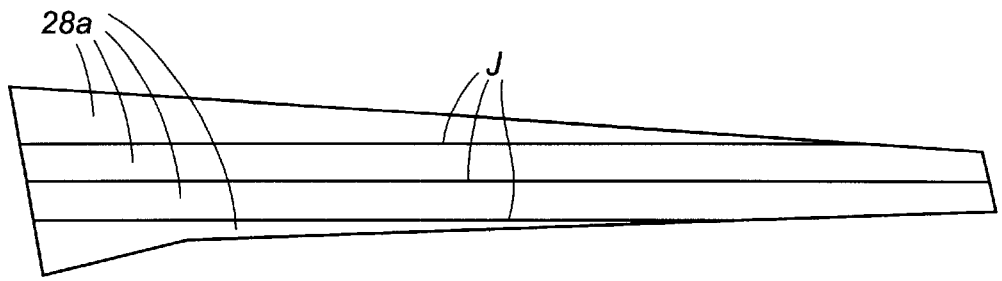
Figure 5:
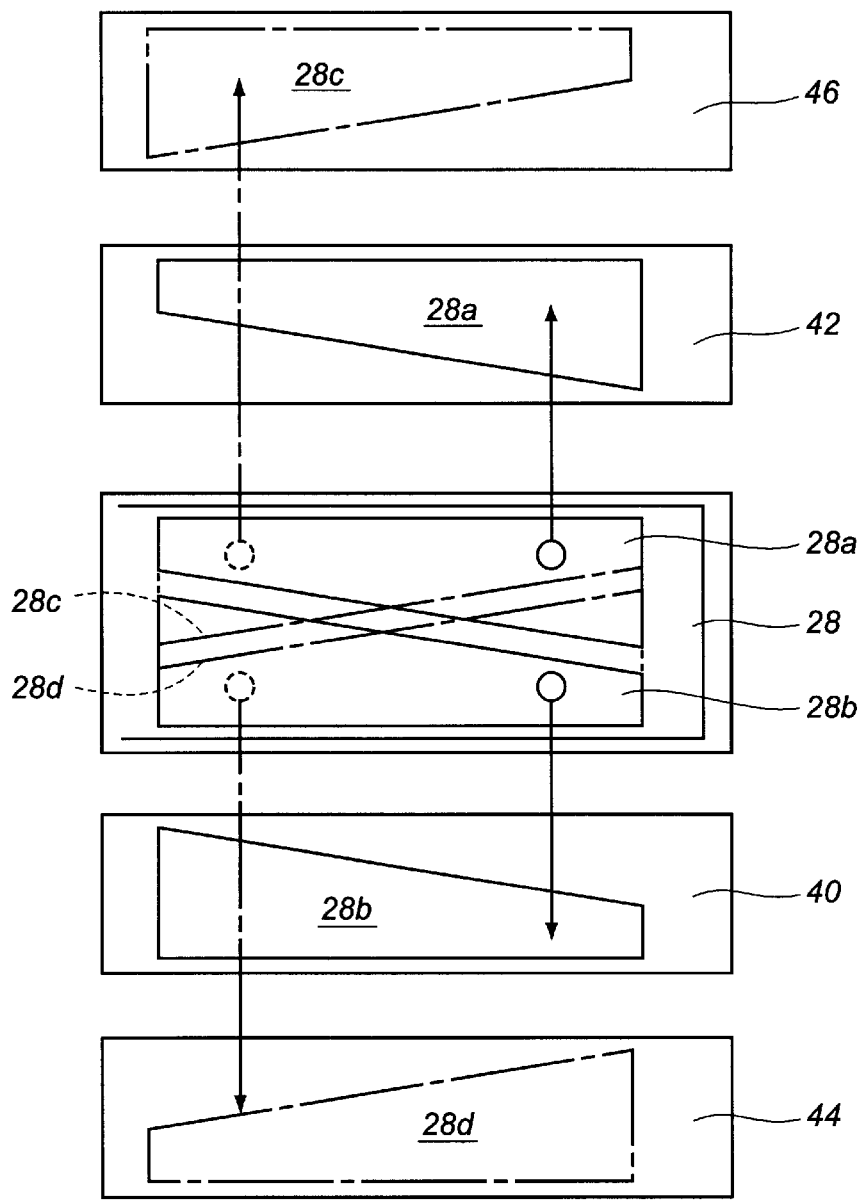

FIG. 4 is a plan view showing the way in which individual lengths of fabric are laid up edge-to-edge to form a desired shape; and FIG. 5 is a diagrammatic plan view of forming and lay-up stations of the machine showing the way in which different shapes can be cut from single pieces of material and delivered to the various lay-up stations to produce upper and lower wing skins for port and starboard aircraft wings.

Figure 1:
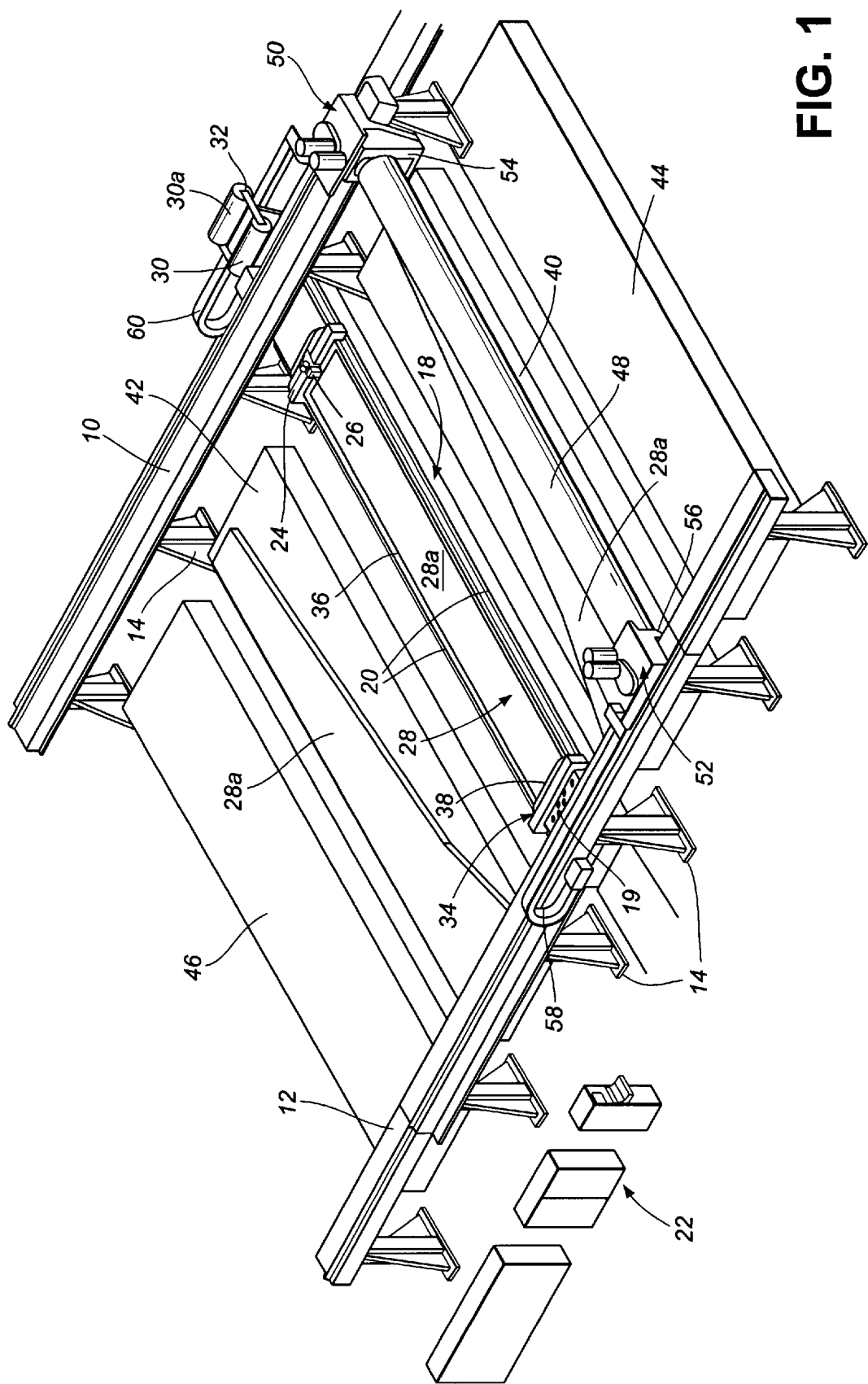
FIG. 1 is a perspective view of a preferred form of machine in accordance with the invention.

Looking at FIG. 1, two parallel rails 10,12 are carried by floor mount supports 14. A floor mounted table 18 of rectangular shape extends between the rails 10, 12. The table 18 has a perforated upper surface 19 which extends across a multiplicity of honeycomb cells which can be selectively evacuated or pressurised. The table 18 has two parallel rails 20, arranged one each side thereof which slideably support a cross beam 24 on which a laser cutter 26 is slideably mounted. The cross beam 24 is driveable along the rail 22 by a motor-driven rack and pinion (not shown). Likewise, the laser cutter 26 is driveable along the cross beam 24 by a motor-driven rack and pinion (not shown). The table 18 may be somewhat like the table described in EP-A-0 118 266 to which the reader is directed for details. The motors for driving the cross member 24 and the laser cutter 26 are programmed by suitable software at a control station 22 to enable the correct shape to be cut from a sheet of fibre reinforced fabric 28 which is drawn on to the table 18 from a roll of fabric 30. The roll of fabric 30 forms part of a two-roll carousel 32 which may carry either a second roll of fabric 30a or a roll of alternative fabric. The carousel 32 may include more than two-rolls if desired. In order to draw a length of fabric 28 onto the table 18, a pick-up device 34 is provided. The pick-up device 34 is also mounted on the rails 20 and is driveable on the rails by a suitable motor-driven rack and pinion (not shown). The pick-up device moves towards the carousel 32 and the cross beam 24 is also moved slightly toward the carousel 32 so that the pick-up device 34 can pick up the fabric 28 and then move back towards the FIG. 1 position drawing the fabric 28 from the roll 30 beneath the cross beam 24 and over the length of the table 18. Once the fabric 28 has been laid in position, vacuum is applied to hold the fabric in place and the laser cutter 26 cuts the fabric 28 to the desired shape. It will be noted that a peripheral band of waste material 36 is formed by the laser cutter 26 around the desired cut shape of material. Vacuum is released from the cells overlaid by the band of waste 36 and the pick-up device 34 travels over the fabric 28 picking up the band of waste on a roll 38. The roll may comprise a series of paddles or spokes or a disposable cardboard roll which picks up the band 36 as the device 24 moves towards the carousel 32. Once it reaches that end, the cut fabric remaining on the table 18 is ready to be carried to one of two lay-up sections 40,42. If desired the machine can be extended as shown in ghost outline in FIG. 1 to define two or more further lay-up stations 44, 46. Basically, each of the lay-up stations comprises a floor-mounted table.

An elongate roller 48 is mounted on carriages 50,52 which slide on the rails 10,12 respectively. The carriages 50,52 include mountings 54,56 in which the respective ends of the roller 48 are adjustably mounted. Reference should be made to EP-A-0 118 266 for details of the way in which the ends of a roller 48 can be mounted for adjustment. In the present case, the ends of the roller 48 may be moved up and down relative to each other and fore and aft to provide adjustment in pitch and yaw. The mountings 54,56 also enable the axial position of the roller 48 to be adjusted relative to the carriages 50, 52. A drive motor (not shown) is provided on one of the carriages 50,52 for rotating the roller 48 and power for the motor and for motors which adjust the roller 48 is supplied via flexible cable mountings 58,60.

Figure 2:
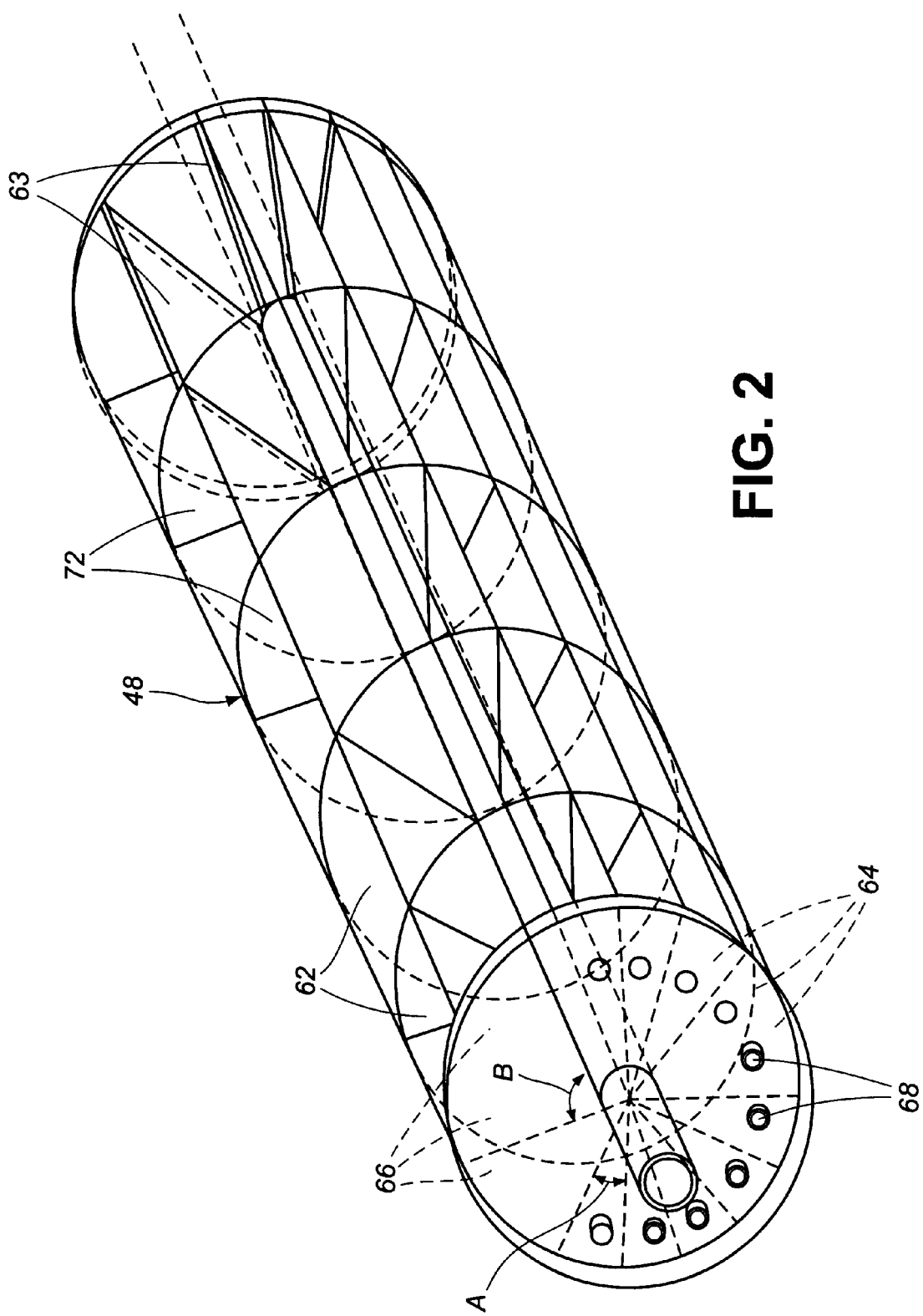
FIG. 2 is a diagrammatic perspective view of part of a roller for the machine shown in FIG. 1.
Figure 3:
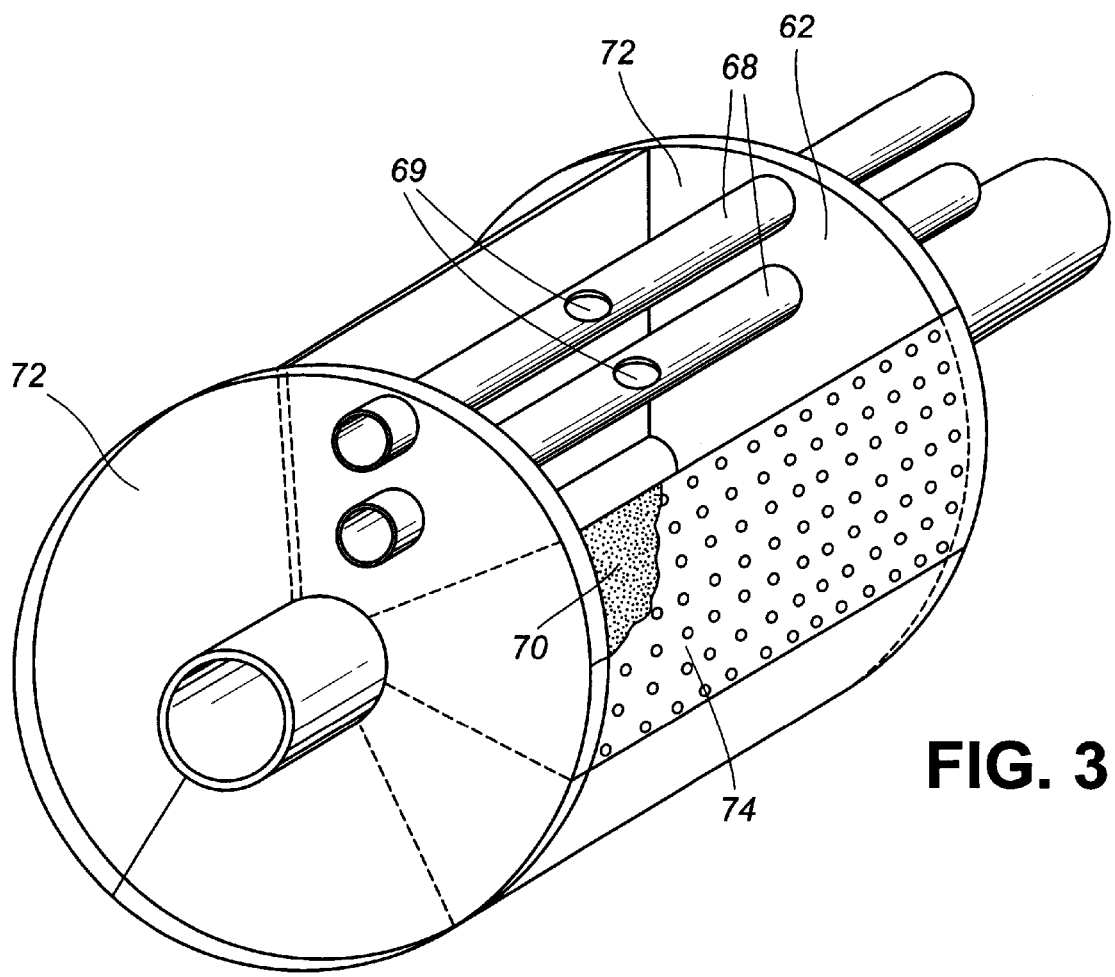
FIG. 3 is a perspective view to a larger scale showing part of the roller of FIG. 2.
Figure 3A:
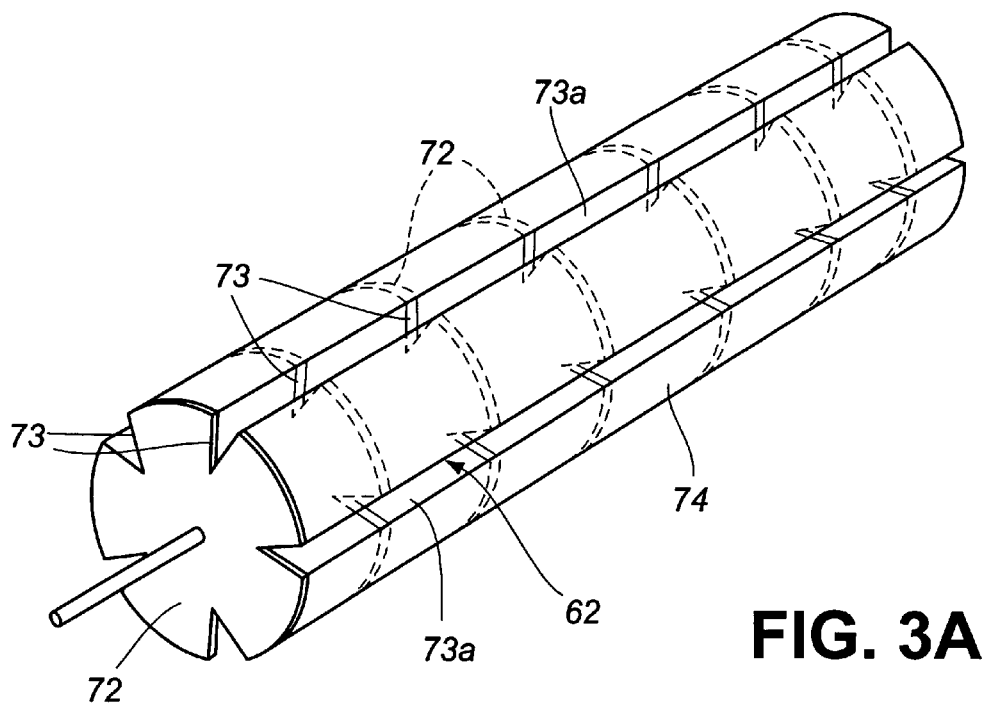
FIG. 3A is a perspective view of a roller formed with cut-outs.

Looking at FIGS. 2 and 3, the roller 48 is divided axially into a plurality of segments 62 each of which is circumferentially divided by plates 63 into a plurality of sectors 64,66. In the present case, each segment 62 is divided into 13 sectors 64, ten of which subtend an angle A and three of which 66 subtend a larger angle B. Vacuum/pressure pipes 68 pass axially along the roller 42 to enable each of the sectors 64 to be evacuated or pressurised through apertures 69. As shown in FIG. 3, two such pipes 68 may pass through each sector 64 from one end of the roller 48. Each sector 64 is occupied by a wedge-shaped piece of open-cell foam material 70. The foam material 70 is sealed at its edges where it contacts circular dividers 72 between the segments 62 and has its cylindrical periphery covered by a perforated sheet of film 74 shown broken away in FIG. 3. The foam inserts 70 form a flexible peiphery for that section of the roller defined by the sectors 64. The larger sectors 66 may be used for other purposes, for example, the carrying of individual components to be placed on the laminate produced during the lay-up procedure. Also, the dividers 72 or plates 63 which define the sectors may be formed with cut outs which, in the finished laminate will create recesses or projections to cooperate with components such as ribs or stringers of an aircraft wing. FIG. 3A illustrates a roller profile where cut-outs or recesses 73 are formed in the dividers 72 and aligned cut-outs or recesses 73a are formed in the foam inserts 70 for receiving such components. If desired the dividers 72 and foam inserts 70 associated with selected segments 62 may be formed with the cut-outs or recesses 73, 73a.

The position of the roller 48 relative to a datum is known by providing a position sensor (not shown) for the roller 48. The position of the lay-up stations 40, 42 and the position of the shaped fabric 28a on the table 18 are also known accurately in relation to the datum. The angular position of the roller 48 is also accurately determined. The positioning may be effected by known CNC (Computer Numerical Control) methods or by known laser positioning techniques.

Once the roll 38 of the pick-up device 34 has collected the band of scrap 36 as described above, both the cross beam 24 and the pick-up device 34 are moved to the end of the table 18 adjacent the carousel 32. The roller 48 is then moved along the rails 10,12 into a position over the shaped fabric indicated at 28a. The roller 48 is rotated so as to position the film covered periphery correctly in relation to the shaped fabric 28a and the roller is then lowered into contact with the fabric. The cells of the table 18 are pressurised and the sectors 64 of the roller are evacuated. The roller 48 is then moved over the table 18 so that the length of shaped fabric 28a is sucked onto the periphery of the roller so as to extend longitudinally thereof. The roller carriages 50,52 are then driven along the rails 10,12 towards either the lay-up station 40 or the lay-up station 42. In the present case, it is assumed that the roller is moving towards the lay-up station 42. The aforesaid position sensor accurately senses the position of the roller 48 in relation to the lay-up station 42 and when the correct position is reached, pressure is applied to the sectors 64 as the roller 48 rotates and deposits the shaped material 28 on the table of the lay-up station 42. As the roller 48 is doing that, the pick-up device 34 will he drawing a fresh length of fabric 28 from the roll 30 which will then be cut by the laser cutter 26 as before into the appropriate shape dictated by the software. The roller 48 then returns to pick up the next piece of shaped fabric 28a and takes it to the appropriate lay-up station 40 or 42.

The attitude of the roller 48 can be controlled very accurately so that the shaped fabric 28a is laid precisely as required. In that way, several pieces of fabric 28a can be laid edge-to-edge as shown in FIG. 4 to produce a single layer at a particular lay-up station. Further layers can be formed in the same way to produce the laminate, the edge-to-edge joints J in one layer being staggered with respect to the edge-to-edge joints in adjacent layers. The process can be continued automatically until the required laminates have been produced at the lay-up stations 40,42.

By using four lay-up stations 40, 42, 44 and 46, upper and lower skins for port and starboard aircraft wings can be laid up on a single machine. FIG. 5 shows the way in which two shaped pieces of fabric 28a,28b can be cut from a single sheet of fabric 28 to produce upper and lower skins 28a,28b for a starboard wing of an aircraft. The pieces of fabric 28a are carried by the roller 48 to lay-up station 42 and the pieces of fabric 28b are carried by the roller 48 to the lay-up station 40. Sufficient layers of fabric 28a,28b are laid up at those stations to produce laminates of the required thickness. Further pieces of material 28c,28d are also cut from a single piece of material 28 as shown in broken lines and those pieces are carried by the roller 48 to the lay-up stations 44,46 respectively and the procedure is continued so that laminates are produced to form upper and lower wing skins for the port wing of the aircraft. If necessary each piece 28a to 28d may be butted edge-to-edge with other pieces to form a layer of desired form as described above.

If desired, additional components may be placed manually on the laminate being formed at the lay-up stations 40 to 46 during the lay-up process, for example, small pieces of fabric may be used manually as stiffening rims around an access holes formed in the fabric 28 by the laser cutter 26. The roller 48 could be arranged to pick up other components during its journey from the table 18 to the selected lay-up station for deposit at the lay-up station at some point in the lay-up process.

The roller 48a may be tapered or include tapered sectors 62 to vary the way in which the lay-up of the fabric is effected. Normally, however, the roller 48 will be substantially cylindrical throughout its entire length.

Once the lay-up is complete at the lay-up stations 40, 42, the laminate then needs to be prepared for curing in an autoclave. Normally an uncured laminate on its lay-up table is sealingly covered by what is known as a "bagging film". The bagging film is an impervious layer and once in position on the laminate vacuum is applied beneath the bagging film so as to draw it into firm contact with the uncured laminate. The assembly is then placed in an autoclave under pressure, the resultant force from the combined vacuum and pressure consolidating the laid up fabrics during the curing process. Once cured, the laminate is then removed from the autoclave and taken off the lay-up table for use. Conveniently, the machine may be arranged to lay the bagging film onto the laminate after the lay-up procedure is complete. In that respect, the alternative roll 30a on the carousel 32 may comprise a roll of bagging film which is drawn onto the table 18 by the pick up device 34. Once in position, it is picked up by the roller 48 and carried to the appropriate lay-up station 40,42 where it is deposited on the laid-up fabric. Once in position, the bagging film is sealed around the laminate manually prior to the vacuum being applied.

If desired, the carousel 32 may carry several different rolls of material. For example, one roll may comprise material made by a tape-laying machine where the tape has been laid in one direction. Another roll may have similar material where the tape is rolled in a different direction and several rolls of that type may be used. Commonly used directions for wing skin manufacture are 0° (spanwise for the wing) +45°, −45° and 90° (substantially chordwise). The various rolls of material at the carousel may accommodate each of those directions to produce a lay-up of a multi-axial type. if desired, any one of the rollers at the carousel could carry a fabric which is already in the form of a multi-axial lay-up of materials rather than being a material which is produced as a lay-up of tapes in a single direction. The thickness of the fabrics to be used may be in the range of 0.25 mm to 1.5 mm.

The materials for which the fabric is produced may be of a dry fibre type for subsequent impregnation with a suitable matrix or binder, a ready impregnated material or a fabric containing a pre-forming binder. Pre-forming binders are used to help shape dry fibre material which is subsequently impregnated with resin by RTM (Resin Transfer Moulding) or RFI (Resin Film Infusion). The dry fibre has a very small coating of resin to aid handling and cutting due to the fibres being held together better than when uncoated.

Whilst specific refererence has been made to the case of a laser cutter 26, the cutter 26 may be an ultrasonic cutter or a reciprocal knife.

What is claimed is:

1. A machine for laying up fabric to produce laminates, comprising a forming station for receiving a piece of fabric, profiling means at the forming station for shaping the fabric, a plurality of lay-up stations and carrier means adapted to carry die shaped fabric from the forming station to the lay-up stations and lay it in position at a selected lay-up station progressively to form a laminate at each station.

2. A machine according to claim 1 in which means is provided for positioning the piece of fabric at the forming station.

3. A machine according to claim 1 in which the forming station comprises a table on which the piece of fabric is placed.

4. A machine according to claim 3 in which the table includes retention means and/or release means for the piece of fabric.

5. A machine according to claim 4 in which the retention means includes provision for applying vacuum to the underside of the fabric lying on the table and, where release means is provided, the release means includes provision for applying a positive pressure to the said underside of the fabric.

6. A machine according to claim 1 in which the profiling means forms the fabric to leave a peripheral length of fabric waste.

7. A machine according to claim 6 in which a single piece of waste is formed.

8. A machine according to claim 6 in which removal means is provided for removing the waste.

9. A machine according to claim 8 in which the removal means is a rotary member such as a wheel or a roll.

10. A machine according to claim 8 which the removal means is a disposable element which can be disposed of along with the scrap removed thereby.

11. A machine according to claim 8, and where retention means is provided, the retention means is operable to retain the remainder of the fabric in place while the scrap is removed.

12. A machine according to claim 8 in which the removal means is arranged also to position the piece of fabric at the forming station.

13. A machine according to claim 1 in which the carrier means comprises an elongate roller.

14. A machine according to claim 13 in which the shaped fabric is elongate and is picked up by the roller so as to lie around the periphery of the roller and to extend longitudinally thereof.

15. A machine according to claim 13 in which the roller comprises a plurality of axial segments.

16. A machine according to claim 15 in which each of said axial segments can be subjected to air pressure such as vacuum.

17. A machine according to claim 15 in which one or more of said axial segments includes means such as recesses for receiving elements to be included in the lay up of fabric.

18. A machine according to claim 15, in which one or more of said axial segments is tapered axially of the drum.

19. A machine according to claim 13 in which the roller is divided circumferentially into a plurality of sectors.

20. A machine according to claim 15 in which each of said axial segments is divided into sectors.

21. A machine according to claim 19 in which the angles subtended by some of the sectors are different from those subtended by others.

22. A machine according to claim 19, in which each sector can be subject to air pressure such as vacuum.

23. A machine according to claim 19 in which at least some of the sectors house a foam or foam like material.

24. A machine according to claim 23 in which the foam in each sector has a periphery which lies substantially in the same plane as the periphery of the roller.

25. A machine according to claim 22 in which foam at each segment intersection is sealed.

26. A machine according to claim 23, in which the periphery of the foam is protected by a film layer which may be perforated.

27. A machine according to claim 23 in which the foam has an open cell structure.

28. A machine according to claim 13 in which the attitude of the roller relative to the lay-up stations and/or the forming stations can be varied.

29. A machine according to claim 28 in which the roller is mounted to enable pitch, yaw and/or axial movement thereof to be varied.

30. A machine according to claim 1 in which position sensing means is provided for the carrier means.

31. A machine according to claim 30 in which the position sensing means senses the position of the carrier means relative to a set datum so that the position of the shaped fabric on the carrier means is known relative to the datum and the fabric will be deposited in predetermined position at the selected lay up station.

32. A machine according to claim 30 in which a further position sensing means is provided for sensing the position of the profiling means relative to the or another datum.

33. A machine according to claim 1 in which the profiling means at the forming station is arranged to shape a further piece of fabric between the time that the carrier means has carried away the first piece of shaped fabric to the selected lay-up station and the time it returns to collect the further piece of shaped fabric.

34. A machine according to claim 1 adapted to lay up fabric to produce upper and lower skins for an acrofoil such as port and/or starboard wings of an aircraft.

35. A machine according to claim 34 in which four lay-up stations are provided and receive fabrics for laying up the respective upper and lower skins for port and starboard aerofoils.

36. A machine according to claim 1 in which the laninate is formed by laying a plurality of elongate shaped fabric pieces edge-to-edge to form a first layer and by laying additional elongate shaped fabric pieces edge-to-edge to form one or more further layers on the first said layer.

37. A machine according to claim 36 in which positions of edges of the shaped fabric pieces of one layer are laid by the machine so as to be staggered in relation to the positions of edges of the shaped fabric pieces of an adjacent layer.

38. A machine according to claim 1 in which the piece of fabric is drawn from a supply of the fabric such as a roll.

39. A machine according to claim 38 in which a carousel or the like holding different materials such as various types of fabric is provided for use in the machine.

* * * * *